Figure 1:
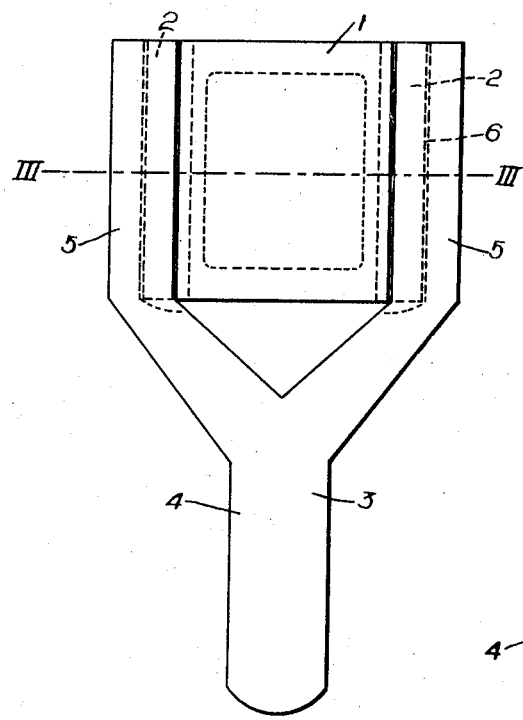

W. H. KEMPTON.
MOLD AND HANDLING DEVICE THEREFOR.
APPLICATION FILED AUG. 26, 1918.

1,332,046.

Patented Feb. 24, 1920.

WITNESSES:

INVENTOR
Willard H. Kempton.
BY
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLD AND HANDLING DEVICE THEREFOR.

1,332,046.  Specification of Letters Patent.  Patented Feb. 24, 1920.

Application filed August 26, 1918. Serial No. 251,386.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molds and Handling Devices Therefor, of which the following is a specification.

My invention relates to molds and handling devices therefor and more particularly to molds for treating material impregnated with a binder adapted to first soften and then harden under the application of heat and pressure.

In molding articles of material treated with shellac or gum as a binder, it is customary to heat the material and the mold, place the treated material in the mold and then dispose the mold in a cold press, after which pressure may be applied. The desired body will be formed before the mold cools the material, as the operation is quickly performed.

In molding bodies of material impregnated with a phenolic condensation product, however, the treated material is placed in a mold and the mold positioned in a hot press, it being necessary to employ a hot press on account of the character of the binder which first softens and then hardens under the application of heat. Heat and pressure are applied simultaneously until the material has been sufficiently compacted and the binder hardened, after which the mold and the body contained therein must be cooled before being removed from the press. If the mold is removed from the press before it is cool, gases, which are formed when a phenolic condensation product is subjected to heat, will tend to force the mold open, with consequent damage to the body contained therein. In view of this, the object of my invention is to provide a mold and handling device therefor by the employment of which the mold, while still held in closed position, may be removed from the press immediately after sufficient pressure and heat have been applied and before the mold has been cooled.

Heretofore, work of this nature has been performed by alternately heating and cooling the hot press in which the material impregnated with a phenolic condensation product was placed but this is a relatively expensive process on account of the quantity of heat wasted. For this reason, I provide a mold and a handling device therefor by the employment of which material impregnated with a phenolic condensation product may be treated without undue waste of heat.

With these and other objects in view, my invention will be more fully described, illustrated in the drawings, in which corresponding numerals indicate like parts, and then particularly pointed out in the appended claims.

Figure 2:
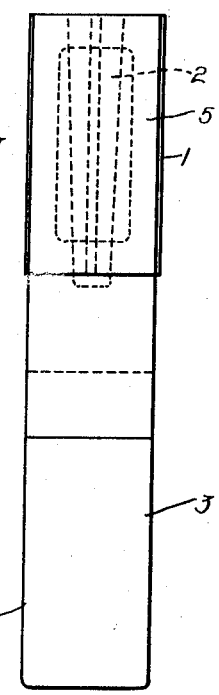
Figure 3:
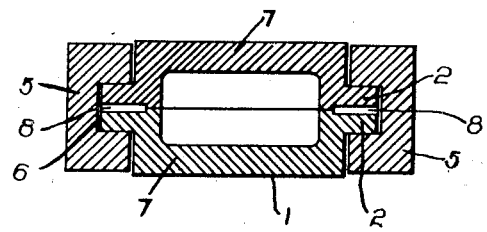

In the drawings, Figure 1 is a plan view of a mold and a handling device therefor embodying my invention; Fig. 2 is a side elevation of the mold and handling device shown in Fig. 1, and Fig. 3 is a sectional view taken on the line III—III of Fig. 1.

In the drawing is shown a sectional mold 1 having side flanges 2 that are of varying thickness from end to end. The mold 1 is shown positioned in a handling device 3 which comprises a handle 4 and prongs 5 that are provided with channels 6 to receive the flanges 2 of the mold 1. The channels 6 in the prongs 5 are so formed that a wedging engagement is effected between their walls and the flanges 2 of the mold 1 so that the mold sections 7 are clamped together. The flanges 2 of the mold 1 are so formed that, when the sections 7 of the mold are placed together, a space 8 is provided between adjacent flanges 2 into which surplus binding material may flow and into which a suitable tool may be inserted for the purpose of separating the mold parts when the material has become fully treated.

My improved mold and handling device are especially adapted for treating articles, such as stacked condensers. The stacked condenser, with its moldable covering, may be placed between the separate sections of the mold and the mold disposed in a hot press, after which pressure may be applied until the condenser is compacted and the binder, with which its covering is impregnated, becomes hardened. The prongs 5, which are thinner than the mold, may then be slipped between the press plates to engage the flanges 2 of the mold. The press may then be opened and the mold removed therefrom and disposed in a cold press to cool. The wedging engagement obtained between the prong channels and the mold flanges prevents any degree of separation of the mold parts during the handling operation, and resultant damage to the body contained therein.

Although I have described specifically structures embodying my invention, it is obvious that minor changes may be made without departing from the spirit thereof, and I desire, therefore, that no limitations shall be imposed except such as are indicated in the appended claims.

I claim as my invention:

1. The combination with a sectional mold having side flanges of varying thickness from end to end, of a transporting means having prongs provided with channels to receive the mold flanges and effect a clamping action thereon.

2. The combination with a sectional mold having side flanges, of a transporting means having prongs provided with channels to receive the mold flanges.

3. The combination with mold sections having projecting portions, of a transporting means having prongs adapted to engage said projecting portions and clamp the sections firmly together.

4. The combination with a sectional mold adapted to have its sections pressed together in a press, of means provided with a handle for clamping the sections of the mold together applicable to the mold while it is in the press.

5. A handling device for a mold comprising a handle having prongs projecting therefrom provided with channels in their opposing faces.

6. A handling device for a mold comprising a handle having prongs projecting therefrom provided with channels tapered from end to end in their opposing faces.

In testimony whereof, I have hereunto subscribed my name this 22nd day of August, 1918.

WILLARD H. KEMPTON.